United States Patent
Sosa

(10) Patent No.: US 7,129,297 B2
(45) Date of Patent: Oct. 31, 2006

(54) POLYSTYRENE BLENDS AND A METHOD OF MAKING SAME

(75) Inventor: Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 152 days.

(21) Appl. No.: 10/674,034

(22) Filed: Sep. 29, 2003

(65) Prior Publication Data

US 2005/0070669 A1    Mar. 31, 2005

(51) Int. Cl.
*C08L 23/12*  (2006.01)
*C08L 23/16*  (2006.01)
*C08L 25/16*  (2006.01)

(52) U.S. Cl. ..................... 525/240; 525/241

(58) Field of Classification Search ............... 525/240, 525/241
See application file for complete search history.

(56) References Cited

U.S. PATENT DOCUMENTS

| | | | |
|---|---|---|---|
| 3,658,946 A | 4/1972 | Bronstert et al. | |
| 3,976,721 A | 8/1976 | Satake et al. | |
| 4,111,349 A | 9/1978 | Buckler et al. | |
| 4,144,204 A | 3/1979 | Mittnacht et al. | |
| 4,183,877 A | 1/1980 | Ibaragi et al. | |
| 4,233,418 A * | 11/1980 | Lingier et al. | 525/243 |
| 4,419,488 A | 12/1983 | Fukumoto et al. | |
| 4,482,677 A | 11/1984 | Teranaka et al. | |
| 4,521,569 A | 6/1985 | Bubeck et al. | |
| 4,567,232 A | 1/1986 | Echte et al. | |
| 4,639,494 A | 1/1987 | Imai et al. | |
| 4,777,210 A | 10/1988 | Sosa et al. | |
| 5,194,525 A | 3/1993 | Miura et al. | |
| 5,206,302 A * | 4/1993 | Kohsaka et al. | 525/316 |
| 5,438,097 A | 8/1995 | Liles et al. | |
| 5,551,859 A | 9/1996 | Cantrill et al. | |
| 5,653,867 A | 8/1997 | Jody et al. | |
| 6,031,050 A * | 2/2000 | Nozawa et al. | 525/242 |
| 6,143,833 A | 11/2000 | Klussmann et al. | |
| 6,784,252 B1 * | 8/2004 | Ramanathan et al. | 525/240 |
| 2002/0042476 A1 * | 4/2002 | Kido et al. | 525/191 |
| 2002/0173588 A1 | 11/2002 | Sosa et al. | |
| 2004/0018355 A1 * | 1/2004 | Shikano et al. | 428/323 |
| 2004/0097650 A1 * | 5/2004 | Ogawa et al. | 525/98 |

FOREIGN PATENT DOCUMENTS

| | | |
|---|---|---|
| EP | 0400479 A2 | 12/1990 |
| EP | 0400479 A3 | 12/1990 |
| EP | 0400479 B1 | 12/1990 |

OTHER PUBLICATIONS

Smith, "Transparent High-Impact Polystyrene Resins and Their Manufacture", United States Defensive Publication, T959,011 (Jun. 7, 1977), 1 page.

* cited by examiner

*Primary Examiner*—Nathan M. Nutter
(74) *Attorney, Agent, or Firm*—Tenley R. Krueger; Madan, Mossman & Sriram

(57) ABSTRACT

Disclosed are blends of polystyrene and at least one of syndiotactic polypropylene, ethylene propylene copolymers, and styrene-butadiene-styrene triblock copolymers. These blends are prepared using solution polymerization and have unique morphologies and desirable physical properties. The blends can also be prepared with graft-promoting or crosslinking agents and rubbers to prepare modified high impact polystyrene.

11 Claims, 3 Drawing Sheets

Example 1

Example 2

Example 13

Example 14

Comparative Example I

Comparative Example II

POLYSTYRENE BLENDS AND A METHOD OF MAKING SAME

BACKGROUND OF THE INVENTION

1. Field of the Invention

The present invention relates polystyrene blends. The present invention particularly relates to polystyrene blends prepared using a solution blend process.

2. Background of the Art

Polystyrene is one of the largest volume thermoplastic resins in commercial production today. Unmodified polystyrene is well suited to applications where its brittleness is acceptable. Engineering plastics have been used in applications where less brittleness is required, but such polymers are often expensive or have properties other than less brittleness that make them less than optimum selections. Thus, styrene-based copolymers, and particularly polystyrene resins that are modified with organic rubber particles, have been investigated for use in applications requiring less brittleness. The modification of polystyrene to reduce brittleness is often referred to increasing its impact properties and thus the modified polystyrene is said to have higher impact.

These high-impact polystyrene blends, commonly referred to by the acronym HIPS, are known to be useful in the art of preparing articles with polymers wherein the application for the articles requires less brittleness than unmodified polystyrene. For example, U.S. Defensive Publication T59,011 to Smith discloses that a high impact resin can be prepared by blending from 15 to 50 parts of an impact modifier with from 85 to 50 parts of a clear crystal polystyrene. Such materials are disclosed to be useful for packaging applications.

Another method of making HIPS is to first dissolve a rubber in styrene monomer and then polymerize the monomer. Such polymers are disclosed in U.S. Pat. No. 6,569,941 to Sosa, et al. Therein, it is disclosed that styrene monomer containing a dissolved polybutadiene rubber is flowed into an elongated upflow stirred reactor containing three reaction zones, wherein the styrene monomer is polymerized to form a HIPS.

It is also known to blend polystyrene with other materials. For example, U.S. Pat. No. 5,194,525, to Miura et al, discloses a continuous process for making polystyrene from styrene monomer and a polymerizable unsaturated fatty acid. The inclusion of the unsaturated fatty acid is disclosed to improve the heat resistance and moldability of the blend, making the modified polystyrene desirable for injection molding applications.

In HIPS, desirably the polystyrene is a continuous phase including a discontinuous phase of rubber particles. The size and distribution of the rubber particles in the continuous polystyrene phase can affect the properties of the HIPS. In blends of polystyrene with other materials, the distribution of the noncontinuous phase in the continuous polystyrene phase is often similarly important.

SUMMARY OF THE INVENTION

In one aspect, the present invention is a polystyrene blend wherein the blend is a blend of polystyrene and a polymer selected from the group consisting of syndiotactic polypropylene, ethylene propylene copolymer, and mixtures thereof, and the blend is prepared by solution polymerization.

In another aspect, the present invention is a polystyrene blend wherein the blend is a blend of polystyrene, rubber, and a polymer selected from the group consisting of syndiotactic polypropylene, ethylene propylene copolymer, hydrogenated styrene butadiene copolymers, and mixtures thereof, and the blend is prepared by solution polymerization.

In still another aspect, the present invention is a process for preparing a polystyrene blend, the process including admixing styrene and a polymer selected from the group consisting of syndiotactic polypropylene, ethylene propylene copolymer, and mixtures thereof to form a solution, and then polymerizing the styrene monomer.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

Figure 1:
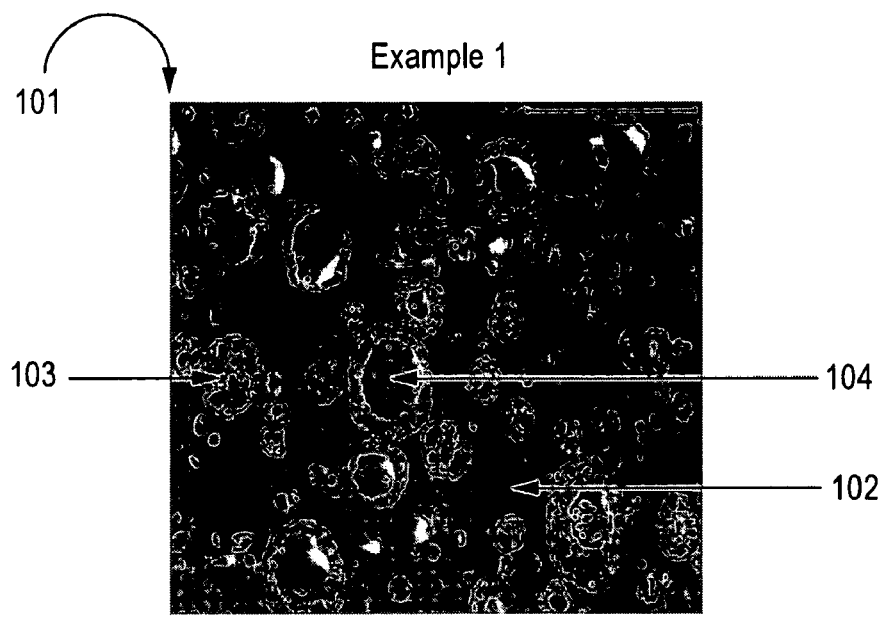
FIG. 1 is a photomicrograph made using transmission electron microscopy (TEM) techniques of a polystyrene blend including 5 percent syndiotactic polystyrene and 6 percent rubber.

It will be appreciated that the figures are not necessarily to scale and the proportions of certain features are exaggerated to show detail.

DETAILED DESCRIPTION OF INVENTION

In one embodiment, the present invention is a blend of polystyrene and a polymer selected from the group consisting of syndiotactic polypropylene, ethylene propylene copolymer, styrene-butadiene-styrene copolymers, and mixtures thereof. In another embodiment the blend additionally includes a rubber.

The polymers useful with the present invention are any that are readily soluble in styrene at temperatures of from 30° C. to 100° C. For purposes of the present invention, readily soluble means soluble at a concentration of at least 15 weight percent after stirring at about 110° C. to about 1 hour. It is desirable that the polymers be soluble at temperatures that are sufficiently low to avoid thermal polymerization of polystyrene during the dissolution process.

The syndiotactic polypropylene useful with the present invention is any that is soluble in styrene at temperatures of from about 30° C. to 100° C. For example, EOD-99-19 from ATOFINA is such a material. In one embodiment the syndiotactic polypropylene useful with the present invention has a melt flow index according to ASTM D-1238 of from about 5 to about 50 g/10 minutes. In another embodiment, the syndiotactic polypropylene useful with the present invention has a melt flow index of from about 22 to about 27 g/10 minutes. In still another embodiment, the syndiotactic polypropylene useful with the present invention has a melt flow index of about 25 g/10 minutes. These materials can be prepared using any catalysts system provided they meet the above solubility and melt flow properties.

Ethylene propylene copolymers, random or impact, can also be used with the present invention. Such copolymers can be prepared, for example, by first performing a heterocatalyst polymerization of a propylene feed followed by a feed of ethylene or a mixture of propylene and ethylene. In the alternative, a compounded form of an ethylene propylene copolymer can be used where an admixture of polyethylene and polypropylene are first admixed and then compounded to produce a copolymer. The ethylene propylene copolymers useful with the present invention can have an ethylene content of from about 0.1 to about 14 weight percent or even of from about 4 to about 12 weight percent. In another embodiment, the ethylene propylene copolymers useful with the present invention can have an ethylene content of from about 6 to about 8 weight percent. Commercially available ethylene propylene copolymers useful with the method of the present invention include, but are not limited to EOD-96-34, FINA 6824 MZ, FINA 4824 WZ, and FINA 7825 from ATOFINA. Any ethylene propylene copolymers that are soluble in styrene at temperatures of from about 30° C. to 100° C. can be used with the present invention.

Certain styrene-butadiene-styrene triblock polymers can also be used with the present invention. One such triblock polymer is the KRATON G1600 series from KRATON POLYMERS. This material is a linear styrene-(ethylene-butylene)-styrene triblock. Any such polymer that is readily soluble in styrene as defined above can be used with the process of the present invention. These materials can be used either with or without removal of some or all residual unsaturation.

In the practice of the method of the present invention of preparing a polystyrene blend, a rubber is sometimes included in the components of the polystyrene blend. Rubbers useful with the method of the present invention include polybutadiene (PB), and styrene-butadiene rubber (SBR). Natural rubbers can also be used. Exemplary rubbers useful with the present invention include some of the TARKENE® rubbers from BAYER and BUNA® EP rubbers from BAYER. Any rubber that is soluble in styrene at temperatures of from about 30° C. to 100° C. can be used with the present invention.

The blends of the present invention are prepared by admixing styrene and syndiotactic polypropylene, ethylene propylene copolymer, and mixtures thereof. In a first embodiment of the present invention, the polymers or mixture of polymers is soluble, as defined above, in the styrene. In a second embodiment, a solvent can also be used to increase the solubility of the polymers in the styrene monomer. Suitable solvents include ethylbenzene, toluene, xylenes, and cyclohexane and mixtures thereof. Any solvent useful to facilitate the full or partial dissolution of rubber, syndiotactic polystyrene, or ethylene propylene copolymer in styrene monomer that can be removed after polymerization of the styrene monomer and does not interfere with the polymerization of the styrene monomer can be used with the method of the present invention. In this embodiment of the present invention, the breadth of polymers and rubbers useful with the present invention is increased to include those polymers and rubbers that are soluble as defined above in the solvent and styrene admixture.

In the practice of the process of the present invention, the admixture of monomer and polymer or polymer mixture is further admixed with a polymerization catalyst. This process is a solution polymerization process. Exemplary catalysts include peroxide catalysts such as, but not limited to Lupersol® 331 (1,1-di-(t-butylperoxy)cyclohexane Lupersol® 531 (1,1-di-(t-amylperoxy)cyclohexane); Lupersol 231 (1,1-di-(t-butylperoxy)-3,3,5-trimethyl-cyclohexane); Lupersol TAEC (OO-t-amyl-O-(2-ethylbexyl monoperoxy-carbonate); Lupersol TBIC (OO-t-butyl O-isopropyl monoperoxy-carbonate); Lupersol TBEC (OO-t-butyl-O-(2-ethylhexyl) monoperoxy-carbonate); Trigonox® 17 (N-butyl-4,4-di(t-butylperoxy)valerate); and Lupersol 233 (Ethyl 3,3-Di-(t-butylperoxy)butyrate). Other catalysts that can be used with the method of the present invention any peroxide having a one-hour half-life of form 80° C. to 160°.

The polymerization of the styrene monomer can be done using any method known to be useful to those of ordinary skill in the art of preparing polystyrene blends. For example, the polystyrene blends can be prepared using an upflow reactor. The polymerization process can be either continuous or done in batches. The temperature ranges useful with process of the present invention can be selected to be consistent with the operational characteristics of the equipment used to perform the polymerization. In one embodiment, the temperature range for the polymerization can be from about 100° C. to about 230° C. In another embodiment, the temperature range for the polymerization can be from about 120° C. to about 150° C.

The blends of the present invention can also be prepared using, as additional components, graft promoters, such as maleic anhydride; chain transfer agents, such as dodecyl mercaptan; or a crosslinking agent, such as divinyl benzene. Exemplary graft promoting, chain transfer, and crosslinking agents include dodecyl mercaptan, maleic anhydride and divinyl benzene, and mixtures thereof. The use of such crosslinking agents with the process of the present invention can increase the compatibility of the components and further improve the properties of the blends made therewith. When used, the graft-promoting crosslinking agent can be used at levels of from about 100 to about 10,000 ppm. In one embodiment of the present invention, the graft-promoting crosslinking agent is used at levels of from about 1000 to about 8000 ppm. The use of a crosslinking agent can be useful in polystyrene blends of the present invention wherein the blend does not contain a rubber.

One embodiment of the present invention is a blend of polystyrene with syndiotactic polypropylene. In styrene blends where the blend is composed primarily of polystyrene and syndiotactic polypropylene, the weight ratio of polystyrene to syndiotactic polypropylene, PS:sPP, can be from about 19:1 to about 4:1. In another embodiment, the the weight ratio of polystyrene to syndiotactic polypropylene, PS:sPP, can be from about 15:1 to about 10:1.

In another embodiment, the present invention is a blend of polystyrene with ethylene propylene copolymer. In styrene blends where the blend is composed primarily of polystyrene and ethylene polypropylene copolymer, the weight ratio of polystyrene to ethylene polypropylene copolymer, PS:EPC, can be from about 19:1 to about 4:1. In another embodiment, the weight ratio of polystyrene to ethylene polypropylene copolymer, PS:EPC, can be from about 15:1 to about 10:1.

In still another embodiment, the present invention is a blend of a high impact polystyrene, that is a mixture of rubber and styrene, with syndiotactic polypropylene. In styrene blends where the blend is composed primarily of HIP and syndiotactic polypropylene, the weight ratio of HIP to syndiotactic polypropylene, HIP:sPP, can be from about 19:1 to about 4:1. In another embodiment, the the weight ratio of polystyrene to syndiotactic polypropylene, PS:sPP, can be from about 15:1 to about 10:1.

In another embodiment, the present invention is a blend of polystyrene with HIP. In styrene blends where the blend is composed primarily of HIP and ethylene polypropylene copolymer, the weight ratio of HIP to ethylene polypropylene copolymer, HIP:EP, can be from about 19:1 to about 4:1. In another embodiment, the weight ratio of polystyrene to ethylene polypropylene copolymer, PS:EP, can be from about 15:1 to about 10:1.

When the polystyrene blend is a HIP blend, the weight ratio of polystyrene to rubber, PS:RUBBER, is from about 99:1 to about 7:1. In another embodiment, the weight ratio of polystyrene to rubber, PS:RUBBER, can be from about 19:1 to about 10:1. Included in the term "rubber" are any of the materials already described above.

One advantage of a blend over unmodified polystyrene is that it can have better impact properties and can also retain blowing agents, such as carbon dioxide in foam applications. Another application of the compositions of the present invention is in the use of containers in contact with food items such as salad oil. The blends of the present invention also compare favorably to conventional HIPS. The blends of the present invention can have morphologies that have better dispersion of the non-continuous phase within the continuous polystyrene phase. Preferably, the non-continuous components are evenly distributed, intermixed and exist as spheres rather than as elongated cylinders within the continuous polystyrene phase of the blends. This effect can be enhanced using graft-promoting agents, such as maleic anhydride. The net effect of using polyolefins is to modify the impact and solvent properties of the polystyrene composites. Increased ductility is obtained by enhancing the rubber phase volume of the composite.

The polystyrene blends of the present invention can be prepared using additives. Exemplary additives include fillers such as talc, anti-oxidants, UV stabilizers, mineral oil, and the like. Any additive known to be useful in preparing polystyrene blends to those of ordinary skill in the art of preparing such blends can be used with the present invention.

In an embodiment of the present invention wherein there is residual monomer at the end of the polymerization of the styrene monomer, the monomer can be removed from the polystyrene blend. In embodiments where a solvent is used, the solvent can be removed from the polystyrene blend. Any method of removing unreacted styrene monomer and solvent, if any, known to be useful can to those of ordinary skill in the art of manufacturing polymer blends can be used with the method of the present invention. After removal, the solvent and styrene monomer can be recycled or discarded.

EXAMPLES

The following examples are provided to illustrate the present invention. The examples are not intended to limit the scope of the present invention and they should not be so interpreted. Amounts are in weight parts or weight percentages unless otherwise indicated.

Example 1

A HIP polystyrene blend is prepared by dissolving 5 percent of a syndiotactic polypropylene sold under the trade designation EOD 99-19 by ATOFINA and 6 percent of a percent rubber sold under the trade designation TAKTENE® 550 T by BAYER in styrene monomer at 110° C. 300 ppm Lupersol® L-531, 100 ppm Lupersol L-233 and 400 ppm maleic anhydride are added and the solution held at 110° C. for 120 minutes. The admixture temperature is raised to 130° C. and held for 60 minutes. The admixture temperature is raised to 150° C. and held for 60 minutes. During the course of and at the end of the heating periods, samples are removed and devolatized at 225° C. for 25 minutes at a pressure of 0.8 torr (107 Pascal). The solids level in the samples is about 70%. A sample of the final polymer is subjected to transmission electron microscopy to prepare a photomicrograph that is shown below as FIG. 1. It takes about 5–10 minutes for dissolution of the syndiotactic polypropylene in the styrene monomer.

Example 2

Figure 2:
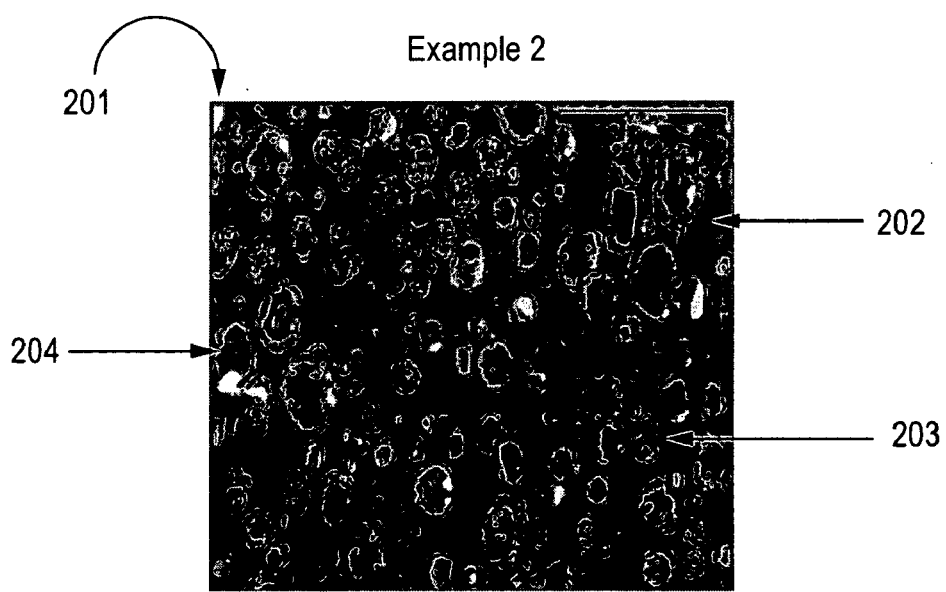
FIG. 2 is a TEM photomicrograph of a polystyrene blend including 10 percent syndiotactic polystyrene and 6 percent rubber.

Example 1 is repeated and tested substantially identically except that 10 percent syndiotactic polypropylene is used and the TEM photomicrograph is shown below as FIG. 2.

An examination of the electron photomicrographs of the polymers of Example 1 and Example 2 (FIGS. 1 & 2) shows that the polymers (101 & 201) have a continuous polystyrene phase (102 & 202) and, distributed therein, inclusions of syndiotactic polystyrene and polybutadiene. These inclusions consist of primarily two types. A first type (103 & 203) consists of a honeycomb type structure of black polybutadiene and syndiotactic polystyrene. A second structure (104 & 204) consists of a sphere of syndiotactic polystyrene surrounded by a layer or membrane of black polybutadiene.

Examples 3–6

The procedure of Example 1 is repeated substantially identically except that components are varied as shown below in Table 1. The samples, prior to being devolatilizing, are analyzed for physical properties and the results as displayed below in Table 1.

TABLE 1

Formulations and Results of HIPS Prepared in the Presence of Syndiotactic Polypropylene And Ethylene Propylene Copolymer And Maleic Anhydride

|  | Example 3 | Example 4 | Example 5 | Example 6 |
|---|---|---|---|---|
| Feed |  |  |  |  |
| % Syndiotactic Polypropylene[1] | 5 | 10 |  |  |
| % Ethylene Propylene Copolymer[2] |  |  | 5 | 10 |
| % Rubber[3] | 8 | 8 | 8 | 8 |
| Maleic Anhydride (PPM) | 1200 | 1200 | 400 | 400 |
| Lupersol 531 (PPM) | 300 | 300 | 300 | 300 |
| Lupersol 233 (PPM) | 100 | 100 | 100 | 100 |
| Properties |  |  |  |  |
| RPS microns[4] | 9.0 | 7.9 | 2.8 | 2.4 |
| % rubber[5] | 16.5 | 15.4 | 6.6 | 6.4 |
| % sPP or EP[6] | 10.4 | 19.3 | 6.1 | 12.5 |
| % gels[7] | 43.8 | 47.4 | 18.9 | 22.4 |
| Swell Index[8] | 7.7 | 7.9 | 11.7 | 8.2 |
| Gel/rubber[9] | 2.7 | 3.1 | 2.9 | 3.5 |
| DMA[10] |  |  |  |  |
| rubber Tg ° C. | −85.4, 2.0 |  | −86.6 | −87.1, −14.4 |
| Tan delta | 0.11, 0.053 |  | 0.049 | 0.041, 0.028 |

EOD 99-19 is a syndiotactic polypropylene having a MFI of 12 available from ATOFINA.
EOD 94-21 is an ethylene propylene copolymer having a MFI of 12–35 available from ATOFINA.

TAKTENE 550 T is a polybutylene rubber having a Mooney Viscosity of 48–55 available from BAYER.

4–10. Test methods. RPS, rubber particle size, is obtained via Malvern Particle Size Analyzer in methyl ethyl ketone; % rubber is obtained by titration with iodine monochloride; % sPP or EP in the product is obtained by calculation as follows: a) % sPP or EP in the feed/1.0—unreacted styrene; b) swell index is obtained by dissolving samples in toluene, separating the gel phase by centrifugation, and obtaining the ratio of the wet gel to dry gel; c) gel/rubber ratio is obtained by calculation from parameters shown within the table, and d) Tg and tan delta values are obtained by using a Rheometrics® RDA II dynamic mechanical analyzer.

Examples 7–12

The procedure of Example 1 is repeated substantially identically except that components are varied as shown below in Table 1. The samples, prior to being devolatilizing, are analyzed for physical properties and the results as displayed below in Table 2.

TABLE 2

Formulation and Results of HIPS Syntheses in the Presence of Syndiotactic Polypropylene, sPP, and Ethylene Propylene Copolymer, EP, and Maleic Anhydride, MA.

| | Example | | | | | |
|---|---|---|---|---|---|---|
| | 7 | 8 | 9 | 10 | 11 | 12 |
| Formulation | | | | | | |
| % sPP[1] | 12 | 12 | 12 | | | |
| % EP[2] | | | | 12 | 12 | 12 |
| % Rubber[3] | 4 | 4 | 4 | 4 | 4 | 4 |
| Lupersol L-531 PPM | 300 | 300 | 300 | 300 | 300 | 300 |
| Lupersol L-233 PPM | 100 | 100 | 100 | 100 | 100 | 100 |
| MA PPM | 2000 | 4000 | 8000 | 2000 | 4000 | 8000 |
| Pellet Properties | | | | | | |
| % Rubber | 6.5 | 6.3 | 7.0 | 6.3 | 6.3 | 7.4 |
| RPS[4] | 5.7 | 6.9 | 6.6 | 2.5 | 2.8 | 3.4 |
| % Gel[5] | 36.5 | 39.2 | 38.4 | 27.5 | 34.0 | 38.7 |
| Swell Index[6] | 5.2 | 4.9 | 5.3 | 5.9 | 4.7 | 4.2 |
| Gel/Rubber[7] | 5.6 | 5.77 | 5.5 | 4.4 | 5.4 | 5.2 |
| Gel/(% PB + PO)[8] | 2.0 | 2.1 | 2.0 | 1.5 | 1.9 | 2.0 |
| Mn (000)[9] | 112 | 103 | 106 | 88 | 105 | 84 |
| Mw (000)[10] | 258 | 235 | 248 | 231 | 247 | 210 |
| MWD[11] | 2.3 | 2.3 | 2.3 | 2.6 | 2.4 | 2.5 |

[1-11]See Table 1

Example 13

Figure 3:
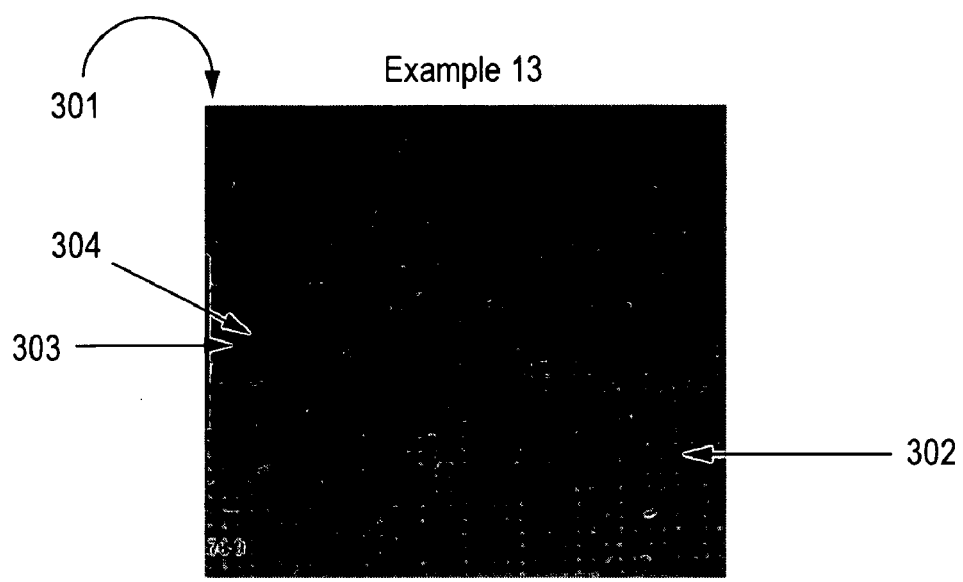
FIG. 3 is a TEM photomicrograph of a polystyrene blend including 10 percent syndiotactic polystyrene and no rubber.

A polystyrene blend is prepared by dissolving 10 percent syndiotactic polypropylene, sold under the trade designation EOD-94-21 by ATOFINA, in styrene monomer at 110° C. 300 ppm Lupersol L-531, 100 ppm Lupersol L-233 and 8000 ppm maleic anhydride are added and the solution held at 110° C. for 120 minutes. The admixture temperature is raised to 130° C. and held for 60 minutes. The admixture temperature is raised to 150° C. and held for 60 minutes. During the course of and at the end of the heating periods, samples are removed and devolatized at 225° C. for 25 minutes at a pressure of 0.8 torr (107 Pascal). The solids level in the samples is about 70%. A sample of the final polymer is subjected to transmission electron microscopy to prepare a photomicrograph that is shown below as FIG. 3.

The morphology of the photomicrograph of Example 13 (FIG. 3) shows that in a polystyrene blend with syndiotactic polypropylene (301), the syndiotactic distributes as small spheres (303) having entrapped polystyrene (304) in a continuous polystyrene phase (302). Note that no rubber is used.

Example 14

Figure 4:
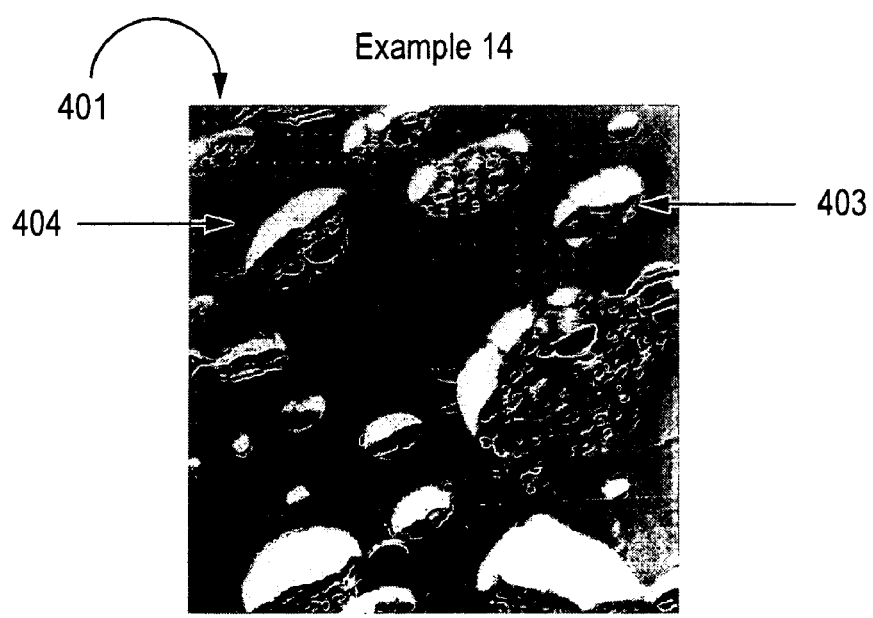
FIG. 4 is a TEM photomicrograph of a polystyrene blend including 10 percent ethylene propylene copolymer and no rubber.

A polystyrene blend is prepared by dissolving 10 percent ethylene propylene copolymer [details . . . either product name or else property listing] in styrene monomer at 110° C. 300 ppm Lupersol L-531, 100 ppm Lupersol L-233 and 8000 ppm maleic anhydride are added and the solution held at 110° C. for 120 minutes. The admixture temperature is raised to 130° C. and held for 60 minutes. The admixture temperature is raised to 150° C. and held for 60 minutes. During the course of and at the end of the heating periods, samples are removed and devolatized at 225° C. for 25 minutes at a pressure of 0.8 torr (107 Pascal). The solids level in the samples is about 70%. A sample of the final polymer is subjected to transmission electron microscopy to prepare a photomicrograph that is shown below as FIG. 4.

The morphology of the photomicrograph of Example 14 (FIG. 4) shows that in a blend of polystyrene and ethylene propylene copolymer (401) the ethylene propylene copolymer distributes as larger spheres, generally not having entrapped polystyrene (403), in a continuous polystyrene phase (402).

Comparative Examples I & II

Figure 5:
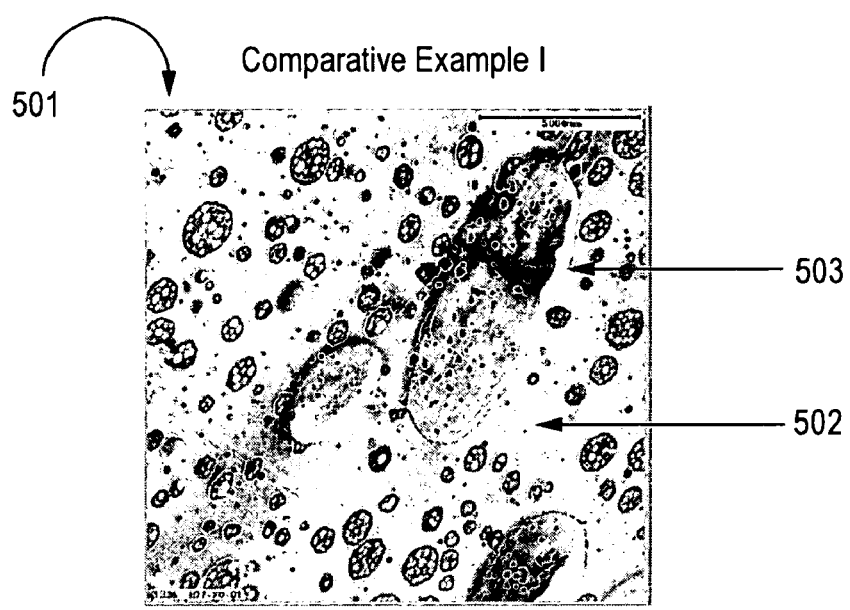
FIG. 5 is a TEM photomicrograph of a polystyrene blend including 5 percent isotactic polystyrene and 4% polybutadiene.
Figure 6:
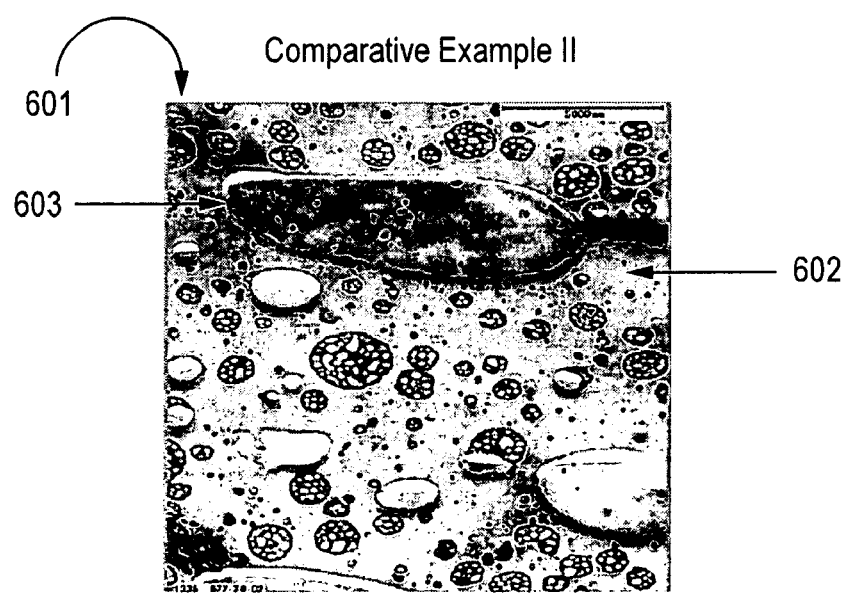
FIG. 6 is a TEM photomicrograph of a polystyrene blend including 10 percent isotactic polystyrene and 4% polybutadiene.

Examples 1 and 2 are repeated substantially identically except that an isotactic polypropylene, sold under the trade designation FINA 4621 is used, is used. Samples of the final polymers are subjected to transmission electron microscopy to prepare a photomicrograph that is shown below as FIG. 5 for Comparative Example I which has 5 percent isotactic polypropylene, and FIG. 6 for Comparative Example II which has 10 percent isotactic polypropylene. It takes about 20–30 minutes to dissolve the isotactic polypropylene in the styrene monomer.

An examination of the photomicrographs of the polymers of Comparative Examples I & II (FIGS. 5 & 6) shows that in a styrene blend of isotactic polypropylene (501 & 601), the isotactic polypropylene form irregular pools (503 & 603) in a continuous polystyrene phase (502 & 602).

What is claimed is:

1. A polystyrene blend comprising a blend of polystyrene and a polymer selected from the group consisting of syndiotactic polypropylene, ethylene propylene copolymer, and mixtures thereof, wherein the blend is prepared by solution polymerization and the polystyrene blend comprises from about 80 wt. % to about 95 wt. % polystyrene.

2. The polystyrene blend of claim 1 additionally comprising performing the solution polymerization using a graft-promoting agent.

3. The polystyrene blend of claim 2 wherein the graft-promoting agent is maleic anhydride.

4. The polystyrene blend of claim 1 additionally comprising performing the solution polymerization using a chain transfer agent.

5. The polystyrene blend of claim 4 wherein the chain transfer agent is dodecyl mercaptan.

6. The polystyrene blend of claim 1 additionally comprising performing the solution polymerization using a cross linking agent.

7. The polystyrene blend of claim 6 wherein the cross linking agent is divinyl benzene.

8. The polystyrene blend of claim 1 additionally comprising an additive.

9. The polystyrene blend of claim 8 wherein the additive is selected from the group consisting of fillers, anti-oxidants, UV stabilizers, mineral oil, and mixtures thereof.

10. A polystyrene blend comprising a blend of polystyrene and syndiotactic polypropylene wherein the blend is prepared by solution polymerization and the weight ratio of polystyrene to syndiotactic polypropylene, PS:sPP, is from about 19:1 to about 4:1.

11. The polystyrene blend of claim 1 wherein the blend is composed primarily of polystyrene and ethylene polypropylene copolymer, and the weight ratio of polystyrene to ethylene polypropylene copolymer, PS:EPC, is from about 19:1 to about 4:1.

* * * * *